United States Patent
Kim et al.

(10) Patent No.: US 9,678,263 B2
(45) Date of Patent: Jun. 13, 2017

(54) SCANNING TYPE BACKLIGHT MODULE AND DISPLAY DEVICE

(71) Applicant: Boe Technology Group Co., Ltd., Beijing (CN)

(72) Inventors: Heecheol Kim, Beijing (CN); Youngsuk Song, Beijing (CN); Seongyeol Yoo, Beijing (CN); Seungjin Choi, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 206 days.

(21) Appl. No.: 14/422,048

(22) PCT Filed: Jun. 5, 2014

(86) PCT No.: PCT/CN2014/000561
§ 371 (c)(1),
(2) Date: Feb. 17, 2015

(87) PCT Pub. No.: WO2015/113186
PCT Pub. Date: Aug. 6, 2015

(65) Prior Publication Data
US 2016/0033709 A1   Feb. 4, 2016

(30) Foreign Application Priority Data

Jan. 29, 2014   (CN) .......................... 2014 1 0043481

(51) Int. Cl.
*F21V 8/00* (2006.01)
*G02B 26/10* (2006.01)
(Continued)

(52) U.S. Cl.
CPC ......... *G02B 6/0018* (2013.01); *G02B 6/0023* (2013.01); *G02B 6/0066* (2013.01);
(Continued)

(58) Field of Classification Search
CPC ... G02B 6/0018; G02B 6/0066; G02B 6/0023
See application file for complete search history.

(56) References Cited

U.S. PATENT DOCUMENTS

| | | | |
|---|---|---|---|
| 2010/0220261 A1* | 9/2010 | Mizushima | G02B 6/0035 349/64 |
| 2011/0043142 A1 | 2/2011 | Travis et al. | |
| 2013/0242606 A1* | 9/2013 | Kurashige | G02B 6/0023 362/609 |

FOREIGN PATENT DOCUMENTS

| | | |
|---|---|---|
| CN | 1648765 | 8/2005 |
| CN | 101082733 | 12/2007 |

(Continued)

OTHER PUBLICATIONS

Office action from Chinese Application No. 201410043481.4 dated Sep. 11, 2015.
(Continued)

*Primary Examiner* — Elmito Breval
(74) *Attorney, Agent, or Firm* — Calfee, Halter & Griswold LLP

(57) ABSTRACT

The embodiments of the invention disclose a scanning type backlight module and a display device. Since a laser light source with good collimation is applied, during a display time of a frame, with the modulation of the optical path regulator, the laser emitted from the laser light source performs a progressive scanning for a region corresponding to at least one row of pixel units in a light guide plate or a display panel. Therefore, the problem of dynamic picture ghosting can be solved effectively; moreover, since the progressive scanning for the entire light guide plate can be realized by changing the light propagation path of the laser emitted from the laser light source with the optical path
(Continued)

regulator, the number of the laser light sources can be reduced and the production cost can be decreased.

12 Claims, 5 Drawing Sheets

(51) Int. Cl.
    *G02F 1/1335*     (2006.01)
    *G02B 6/00*     (2006.01)

(52) U.S. Cl.
    CPC ......... *G02B 26/108* (2013.01); *G02F 1/1336* (2013.01); *G02B 2006/0098* (2013.01); *G09G 2310/024* (2013.01)

(56) References Cited

FOREIGN PATENT DOCUMENTS

| | | |
|---|---|---|
| CN | 101093301 | 12/2007 |
| CN | 101303476 | 11/2008 |
| CN | 101606099 | 12/2009 |
| CN | 101622567 | 1/2010 |
| CN | 101852362 | 10/2010 |
| CN | 101901585 | 12/2010 |
| CN | 103221738 | 7/2013 |
| CN | 203258513 | 10/2013 |
| CN | 103775920 | 5/2014 |
| JP | 2009-186533 | 8/2009 |
| WO | 2008/078543 | 7/2008 |

OTHER PUBLICATIONS

Text of the First Office action from Chinese Application No. 2014100434814 dated Jun. 26, 2015.
International Search Report and Written Opinion from PCT/US14/000561 dated Oct. 27, 2014.
International Search Report and Written Opinion from PCT/CN2014/000561 dated Oct. 27, 2014.

* cited by examiner

SCANNING TYPE BACKLIGHT MODULE AND DISPLAY DEVICE

RELATED APPLICATIONS

The present application is the U.S. national stage entry of International Application No. PCT/CN14/000561 filed Jun. 5, 2014, which claims priority to and the benefit of Chinese Application No. 201410043481.4 filed Jan. 29, 2014, the entire disclosures of which are incorporated herein by reference.

FIELD OF THE INVENTION

The present invention relates to the field of display, in particular to a scanning type backlight module and display device.

BACKGROUND OF THE INVENTION

Currently, liquid crystal display (LCD) devices have become a hot spot in the development of displays due to their high-resolution, very wide color gamut and ultrathin size. LCD devices, however, still need to be improved, for example, to rectify the problem of dynamic picture ghosting resulting from the slow response speed of liquid crystal.

Many solutions aim to solve the problem of dynamic picture ghosting in liquid crystal displays, such as black frame insertion, frequency multiplication, flashing backlight, scanning backlight, etc. Among them, scanning backlight is considered to be the most effective method to improve the problem of dynamic image ghosting. In an existing scanning type backlight module, as shown in FIG. 1, several lamps 102 are mounted on the lateral side of the light guide plate 101 and the liquid crystal display is scanned from top to the bottom with a signal. When a pixel unit corresponding to a lamp is being scanned by the signal, the corresponding lamp is turned on and then turned off after the scanning of the signal.

In the existing scanning type backlight module, diffusion (as indicated with the dashed lines in FIG. 1) occurs when light emitted from the lamp propagates in the light guide plate. A region illuminated by a lamp cannot correspond to the pixel units in one entire row of the liquid crystal display—more than a part of the pixel units in one row of the liquid crystal display are illuminated. Thus, progressive scanning cannot be performed for each row of pixel units in the liquid crystal display, affecting the display quality of the liquid crystal display. Moreover, the existing scanning backlight module needs a large number of lamps mounted on the lateral side of the light guide plate. For large size liquid crystal displays especially, this limitation results in a waste of resources and a relatively large production cost.

Accordingly, it is necessary for those skilled in the art to solve the problem of how to design progressive scanning for each row of pixel units in the liquid crystal display with a scanning type backlight module, while reducing the number of light sources and decreasing the production cost.

SUMMARY OF THE INVENTION

Embodiments of the invention provide a scanning type backlight module and display device to progressively scan each row of pixel units in the liquid crystal display, while reducing the number of light sources and decreasing the production cost.

An embodiment of the present invention provides a scanning type backlight module including: a light guide plate, a laser light source, and an optical path regulator located between the laser light source and a light incident surface of the light guide plate. The light guide plate is divided into a plurality of light guide regions and each of the light guide regions corresponds to at least one row of pixel units in the display panel. During a display time of a frame, with modulation of the optical path regulator, a laser emitted from the laser light source performs a progressive scanning for each of the light guide regions in the light guide plate.

In the context of the present invention, the laser light beam emitted from the laser light source can be collimated, or, have a relatively small divergence angle (such as 5 degree, 10 degree, 15 degree, etc.). A backlight can be achieved with the scattering of the light guide regions. The inventor has realized that due to good collimation of the laser light beam, the scattering in the light guide regions can be used for illuminating the light guide regions adequately, while the scattering will not extend to a large region as shown in FIG. 1 (which will cause the problem of dynamic picture ghosting). Moreover, with the good monochromaticity of laser, the color gamut of the display can be controlled accurately, avoiding a (regional) color error.

According to an embodiment, since a laser light source with good collimation is applied, during a display time of a frame, with modulation of the optical path regulator, the laser emitted from the laser light source performs a progressive scanning for a region corresponding to at least one row of pixel units in a light guide plate or a display panel. Therefore, the problem of dynamic picture ghosting can be solved effectively. Moreover, since the progressive scanning for the entire light guide plate can be realized by changing the light propagation path of the laser emitted from the laser light source with the optical path regulator, the number of the laser light sources can be reduced and the production cost can be decreased.

According to a further embodiment, a lateral side of the light guide plate has a stepped structure corresponding to the light guide regions in an one-to-one correspondence. With modulation of the optical path regulator, the laser emitted from the laser light source is guided towards the stepped structure and illuminates a corresponding light guide region after a total reflection at the stepped structure.

In order to ensure that the laser emitted from the laser light source is totally reflected at the stepped structure, in the scanning type backlight module provided by the embodiment of the invention, the refractive index of the light guide plate is greater than or equal to 2.

According to another embodiment, the optical path regulator includes a prism with an incident surface and an exit surface parallel to each other. A driving device is adapted for rotating the prism such that the exit light of the prism shifts with respect to the light propagation direction of the incident light.

According to an embodiment, in order to ensure that the exit light of the prism shifts with a proper distance with respect to the light propagation direction of the incident light, such that with the modulation of the prism the laser emitted from the laser light source can perform a progressive scanning for the light guide regions in the light guide plate, the refractive index of the prism is greater than or equal to 1.5, and is less than or equal to 1.8.

According to another embodiment, an end of the prism is connected to a supporting member in a rotatable manner and the driving device includes a connecting rod connected with another end of the prism in a fixed manner, a piezoelectric component connected with the connecting rod in a rotatable manner, and a driving chip. The driving chip is adapted for transmitting an electrical signal to the piezoelectric component, such that the piezoelectric element rotates the prism by means of the connecting rod after the length of the piezoelectric element changes.

According to a further embodiment, the piezoelectric component is a piezoelectric ceramic.

According to yet another embodiment, one optical path regulator corresponds to at least one laser light source.

An embodiment of the present invention further provides a display device comprising the scanning type backlight module according to the present invention.

DETAILED DESCRIPTION OF THE INVENTION

Figure 1:
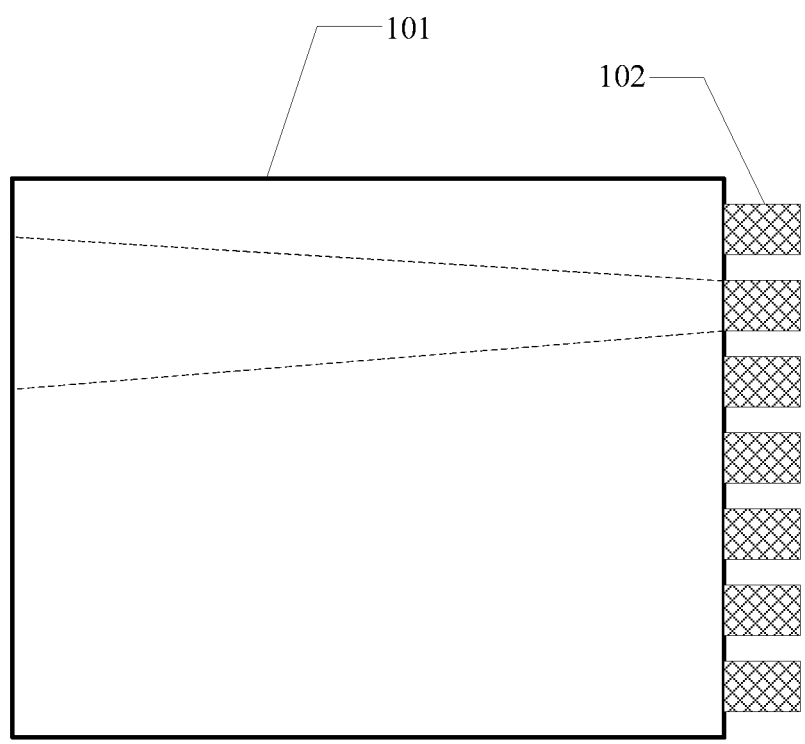
FIG. 1 is a structural schematic diagram of a scanning type backlight module in the prior art.

The present invention will be described below in more detail in combination with the drawings and the embodiments. The following embodiments are used for explanation of the present invention, not for limitation of the scope of the present invention.

As shown in FIGS. 2a-2d, a scanning type backlight module provided by the embodiment of the present invention includes a light guide plate 1, a laser light source 2, and an optical path regulator 3 located between the laser light source 2 and a light incident surface of the light guide plate 1. The light guide plate 1 is divided into a plurality of light guide regions 4. FIGS. 2a-2d illustrate the embodiments with an exemplary four light guide regions. Each of the light guide regions 4 corresponds to at least one row of pixel units in the display panel.

During a display time of a frame, with modulation of the optical path regulator 3, a laser emitted from the laser light source 2 performs a progressive scanning for each of the light guide regions 4 in the light guide plate 1, in a direction indicated with the arrow in FIGS. 2a-2d. Those skilled in the art will understand that it is also feasible if the scanning for the light guide regions 4 in the light guide plate 1 is performed in a direction opposite to the arrow in FIGS. 2a-2d, or in other desired scanning sequences.

In some embodiments, since a laser light source 2 with good collimation is applied, during a display time of a frame, with the modulation of the optical path regulator 3, the laser emitted from the laser light source 2 performs a progressive scanning for a region corresponding to at least one row of pixel units in a light guide plate 1 or a display panel. Therefore, the problem of dynamic picture ghosting can be solved effectively. Moreover, since the progressive scanning for the entire light guide plate 1 can be realized by changing the light propagation path of the laser emitted from the laser light source 2 with the optical path regulator 3, the number of laser light sources 2 can be reduced and the production cost can be decreased.

Figure 2A:
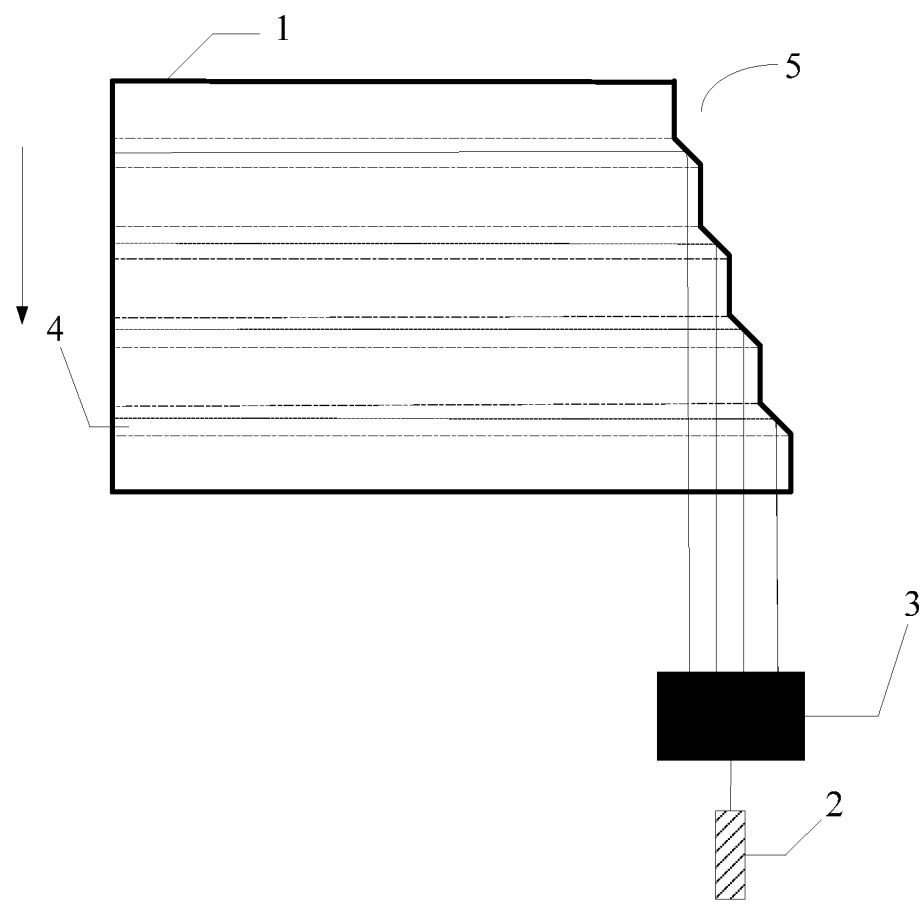
FIGS. 2a-2d are structural schematic diagrams of the scanning type backlight modules provided by the embodiments of the present invention respectively.

In some embodiments, as shown in FIG. 2a, a lateral side of the light guide plate 1 has a stepped structure 5 corresponding to the light guide regions 4 in a one-to-one correspondence. The stepped structure 5 has a plurality of inclined planes, and each of the inclined planes corresponds to one light guide region 4 With modulation of the optical path regulator 3, the laser emitted from the laser light source 2 is guided towards the stepped structure 5 and illuminates a corresponding light guide region 4 after a total reflection at the inclined plane of the stepped structure 5. During the display time of a frame, with modulation of the optical path regulator 3, a laser emitted from the laser light source 2 performs a progressive scanning for each of the light guide regions 4 in the light guide plate 1.

Figure 2B:
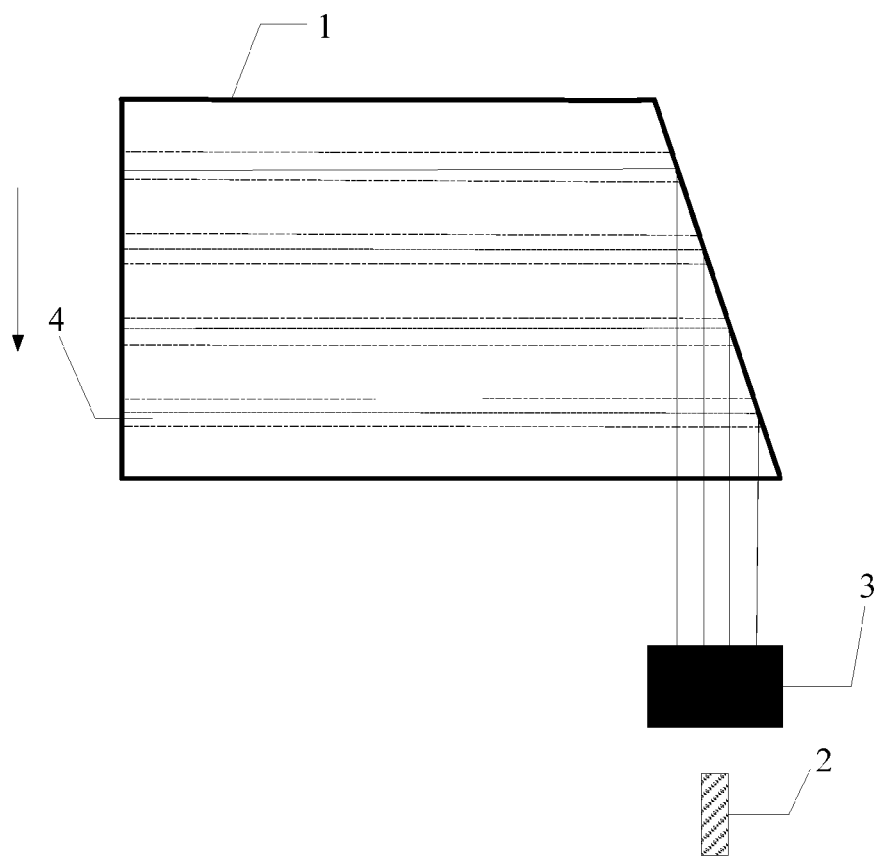

In one embodiment, as shown in FIG. 2b, a lateral side of the light guide plate 1 can also be provided as a whole inclined plane. With modulation of the optical path regulator 3, the laser emitted from the laser light source 2 is guided towards the inclined plane and illuminates the light guide regions 4 after a total reflection at the inclined plane. During the display time of a frame, with modulation of the optical path regulator 3, a laser emitted from the laser light source 2 performs a progressive scanning for each of the light guide regions 4 in the light guide plate 1.

Figure 2C:
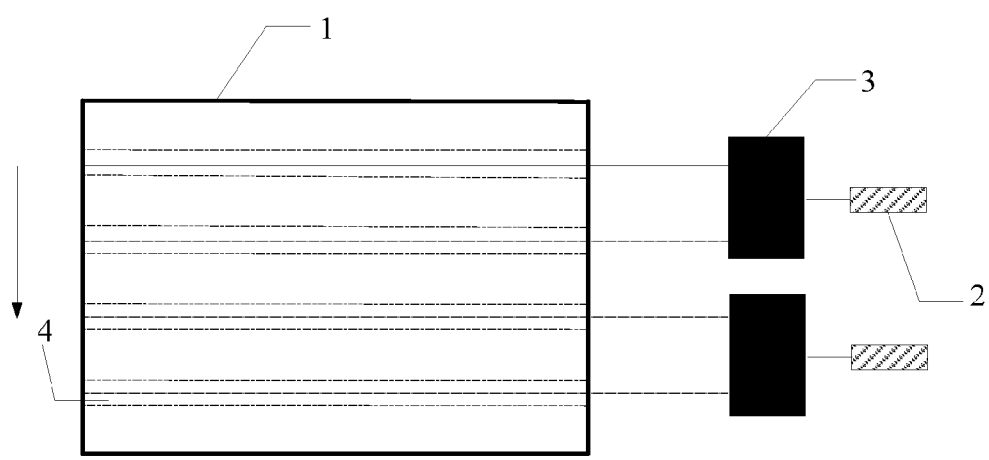

In another embodiment, as shown in FIG. 2c, the positional relationship of the laser light source 2 and the light guide plate 1 can also be modified. With modulation of the optical path regulator 3, the laser emitted from the laser light source 2 can illuminate the light guide regions 4 in the light guide plate 1 directly. The stepped structure or the whole inclined plane provided at the lateral side of the light guide plate 1 is unnecessary. During the display time of a frame, with modulation of the optical path regulator 3, a laser emitted from the laser light source 2 performs a progressive scanning for each of the light guide regions 4 in the light guide plate 1.

Figure 2D:
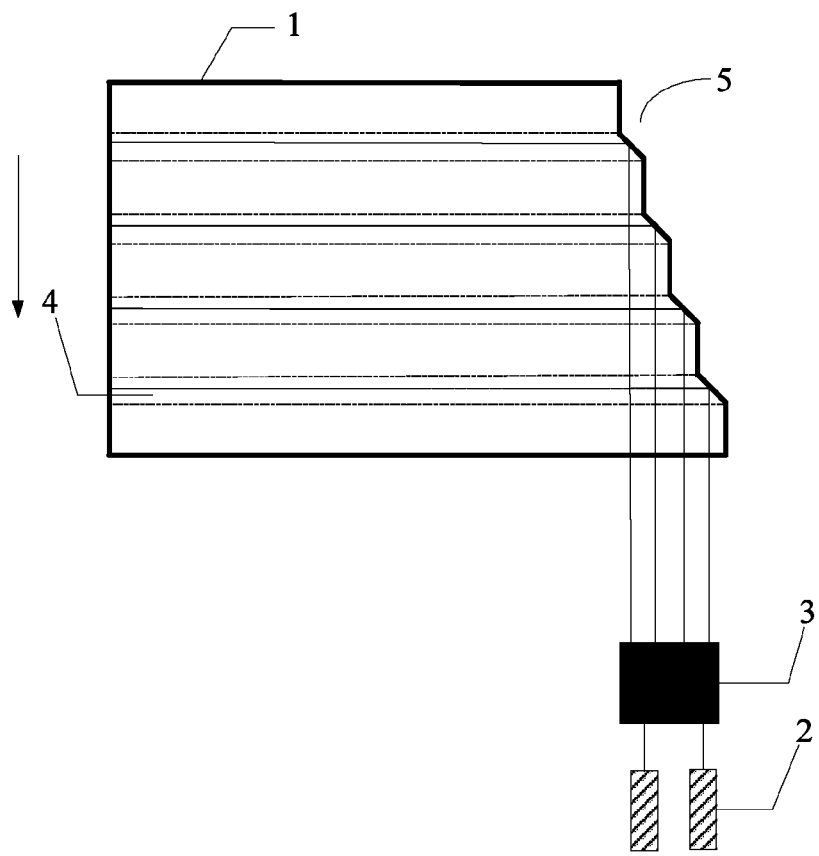

In some embodiments of a scanning type backlight module, as shown in FIGS. 2a and 2b, only one laser light source 2 is provided. In other embodiments, as shown in FIGS. 2c and 2d, a plurality of laser light sources 2 can also be provided. Specifically, FIGS. 2c and 2d illustrate embodiments with an exemplary two laser light sources 2. The light guide regions 4 in the light guide plate 1 can be divided into two parts, and the laser emitted from these two laser light sources 2 performs a scanning for the corresponding light guide regions 4.

The laser light source 2 can be, for example, a monochromatic laser or a white laser. In some embodiments, as shown in FIGS. 2a, 2b and 2d, with modulation of the optical path regulator 3, the laser emitted from the laser light source 2 is totally reflected at the inclined plane. The angle between the incident light and the reflected light is 90 degrees. It should be appreciated that the angle between the incident light and the reflected light can also be other values, as long as the laser emitted from the laser light source 2 can illuminate the light guide regions 4 in the light guide plate 1 eventually.

In some embodiments, in order to ensure that the laser emitted from the laser light source 2 is totally reflected at the stepped structure 5, the light guide plate 1 can be made of a material with a refractive index greater than or equal to 2.

Figure 3A:
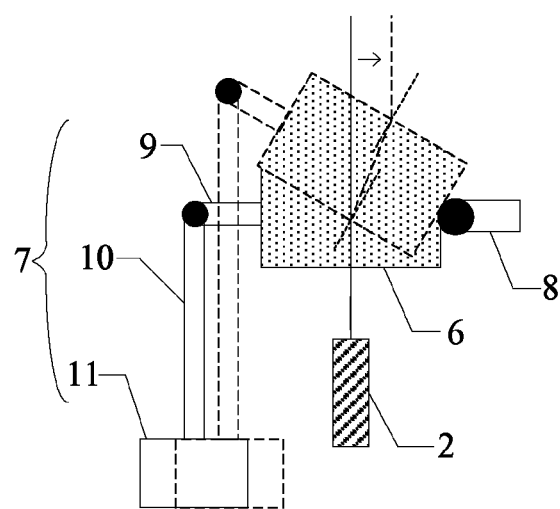
FIGS. 3a-3c are structural schematic diagrams of the optical path regulators in the scanning type backlight modules provided by the embodiments of the present invention respectively.
Figure 3B:
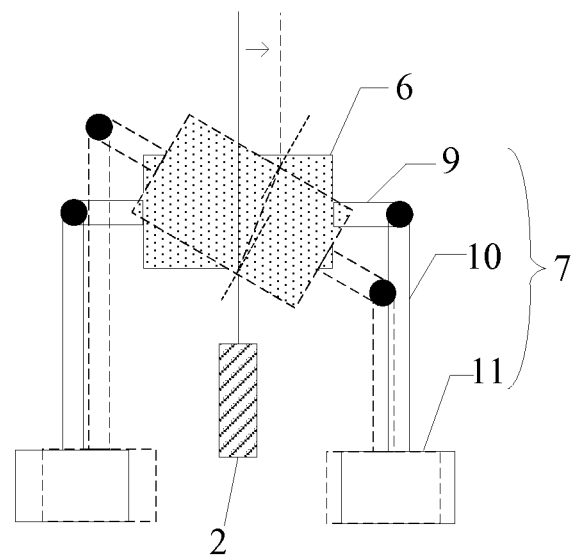
Figure 3C:
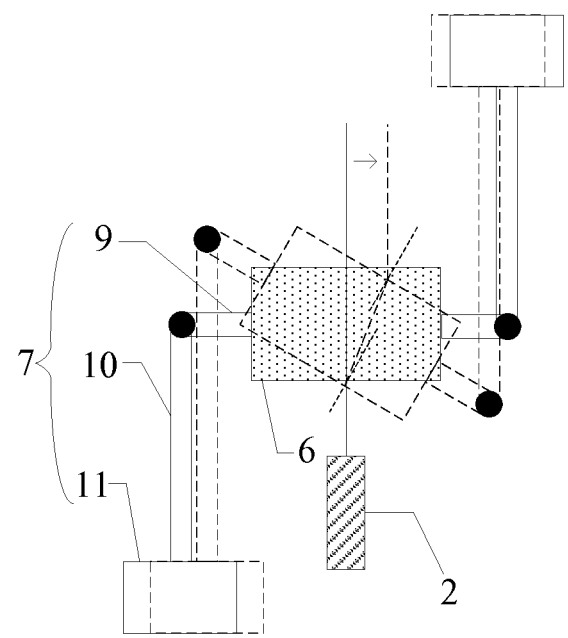

In some embodiments, as shown in FIGS. 3a-3c, the optical path regulator 3 can include a prism 6 with an incident surface and an exit surface parallel to each other, and a driving device 7 adapted for rotating the prism 6 such that the exit light of the prism 6 shifts with respect to the light propagation direction of the incident light. When the prism 6 is rotated by the driving device 7, as shown in FIGS. 3a-3c, the laser emitted from the laser light source 2 is refracted in the prism 6. Thus, the exit light of the prism 6 shifts with respect to the light propagation direction of the incident light (as indicated with the arrow in FIGS. 3a-3c). By changing the rotation angle of the prism 6, the laser emitted from the laser light source 2 can perform a progressive scanning for each of the light guide regions 4 in the light guide plate 1.

In some embodiments, the shift distance for the exit light of the prism with respect to the light propagation direction of the incident light is related to the refractive index of the prism. In some embodiments, the refractive index of the prism is greater than or equal to 1.5, and is less than or equal to 1.8, such that a proper shift distance for the exit light of the prism 6 with respect to the light propagation direction of the incident light can be achieved. With the modulation of the optical path regulator 3, a laser emitted from the laser light source 2 can perform a progressive scanning for each of the light guide regions 4 in the light guide plate 1. Though a large shift of light beam can be achieved with a small thickness when a material of high refractive index is applied, some rows of pixels may not be scanned if the shift is too large. Therefore, preferably, the refractive index of the prism is greater than or equal to 1.5, and is less than or equal to 1.8.

In some embodiments, as shown in FIG. 3a, an end of the prism 6 is connected to a supporting member 8 in a rotatable manner. The driving device 7 may include a connecting rod 9 connected to another end of the prism 6 in a fixed manner, a piezoelectric component 10 connected to the connecting rod 9 in a rotatable manner, and a driving chip 11. The driving chip 11 may be adapted for transmitting an electrical signal to the piezoelectric component 10 such that the piezoelectric element 10 rotates the prism 6 by means of the connecting rod 9 after the length of the piezoelectric element 10 changes. One of skill in the art would appreciate that the structure of the optical path regulator 3 is not limited to the above-described embodiment. Other structures capable of changing the direction of the light emitted from the laser light source 2 are also applicable.

In some embodiments, the material of the piezoelectric component is a piezoelectric ceramic. When the driving chip 11 transmits an electrical signal to the piezoelectric ceramic, the length of the piezoelectric ceramic can change. The piezoelectric element 10 may be made of other materials with similar properties.

In some embodiments, as shown in FIGS. 2a-2c, one optical path regulator 3 can correspond to one laser light source 2; or, as shown in FIG. 2d, one optical path regulator 3 can also correspond to a plurality of laser light sources 2.

Based on the same inventive concept, an embodiment of the present invention also provides a display device, which comprises the scanning type backlight module according to the embodiment of the present invention. The display device can be any product or component with a display function, such as mobile phone, tablet computer, TV, monitor, notebook computer, digital photo frame, or navigator. The implementation of the display device can refer to the above embodiments of the scanning type backlight module, and will not be repeated herein.

According to an embodiment of the invention, since a laser light source with good collimation is applied, during a display time of a frame, with the modulation of the optical path regulator, the laser emitted from the laser light source performs a progressive scanning for a region corresponding to at least one row of pixel units in a light guide plate or a display panel. Therefore, the problem of dynamic picture ghosting can be solved effectively. Moreover, since the progressive scanning for the entire light guide plate can be realized by changing the light propagation path of the laser emitted from the laser light source with the optical path regulator, the number of the laser light sources can be reduced and the production cost can be decreased.

A person skilled in the art may make various alterations and variations to the invention without departing from the spirit and scope of the invention. As such, provided that these modifications and variations of the invention pertain to the scope of the claims of the invention and their equivalents, the invention is intended to embrace these alterations and variations.

The invention claimed is:

1. An apparatus comprising:
a light guide plate;
a laser light source; and
an optical path regulator located between the laser light source and a light incident surface of the light guide plate,
wherein the light guide plate is divided into a plurality of light guide regions, each of the light guide regions corresponding to at least one row of pixel units in a display panel,
wherein during a display time of a frame, with modulation of the optical path regulator, a laser emitted from the laser light source performs a progressive scanning for each of the light guide regions in the light guide plate, and
wherein a lateral side of the light guide plate has a stepped structure corresponding to the light guide regions in a one-to-one correspondence, and wherein with modulation of the optical path regulator, the laser emitted from the laser light source is guided toward the stepped structure and illuminates a corresponding light guide region after a total reflection at the stepped structure.

2. The apparatus according to claim 1, wherein the light guide plate has a refractive index of at least 1.

3. The apparatus according to claim 1, wherein one optical path regulator corresponds to at least one laser light source.

4. The apparatus according to claim 1, wherein the apparatus is a backlight module.

5. The apparatus according to claim 1, wherein the apparatus is a display.

6. An apparatus comprising:
a light guide plate;
a laser light source; and
an optical path regulator located between the laser light source and a light incident surface of the light guide plate,
wherein the light guide plate is divided into a plurality of light guide regions, each of the light guide regions corresponding to at least one row of pixel units in a display panel,
wherein during a display time of a frame, with modulation of the optical path regulator, a laser emitted from the laser light source performs a progressive scanning for each of the light guide regions in the light guide plate, and
wherein the optical path regulator comprises:
a prism with an incident surface and an exit surface parallel to each other; and
a driving device adapted for rotating the prism such that exit light of the prism shifts with respect to a light propagation direction of incident light.

7. The apparatus according to claim 6, wherein the prism has a refractive index of at least 1.5 and not more than 1.8.

8. The apparatus according to claim 6, wherein an end of the prism is rotatably connected to a supporting member and the driving device comprises:
- a connecting rod fixedly connected to another end of the prism;
- a piezoelectric component rotatably connected to the connecting rod; and
- a driving chip adapted for transmitting an electrical signal to the piezoelectric component, such that the piezoelectric element rotates the prism by means of the connecting rod after the length of the piezoelectric element changes.

9. The apparatus according to claim 8, wherein the piezoelectric component is a piezoelectric ceramic.

10. The apparatus according to claim 6, wherein one optical path regulator corresponds to at least one laser light source.

11. The apparatus according to claim 6, wherein the apparatus is a backlight module.

12. The apparatus according to claim 6, wherein the apparatus is a display.

* * * * *